United States Patent
Katsuki (10) Patent No.: US 10,353,351 B2
(45) Date of Patent: Jul. 16, 2019

(54) MACHINE LEARNING SYSTEM AND MOTOR CONTROL SYSTEM HAVING FUNCTION OF AUTOMATICALLY ADJUSTING PARAMETER

(71) Applicant: FANUC CORPORATION, Yamanashi (JP)

(72) Inventor: Kyohei Katsuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 268 days.

(21) Appl. No.: 15/280,989

(22) Filed: Sep. 29, 2016

(65) Prior Publication Data

US 2017/0090434 A1   Mar. 30, 2017

(30) Foreign Application Priority Data

Sep. 30, 2015   (JP) ................................. 2015-193828

(51) Int. Cl.
*G05B 13/00*   (2006.01)
*G05B 13/02*   (2006.01)

(52) U.S. Cl.
CPC ................................ *G05B 13/0265* (2013.01)

(58) Field of Classification Search
CPC ........................... G05B 13/0265; G05B 13/02
USPC ....................................................... 318/561
See application file for complete search history.

(56) References Cited

U.S. PATENT DOCUMENTS

| 2006/0155660 A1* | 7/2006 | Koshizen | G05B 13/0265 706/18 |
| 2007/0239644 A1* | 10/2007 | Minamino | G06N 99/005 706/30 |
| 2010/0318480 A1* | 12/2010 | Kim | G06N 99/005 706/12 |
| 2012/0243265 A1 | 9/2012 | Kurokawa et al. | |
| 2014/0156577 A1* | 6/2014 | Eliasmith | G06N 3/049 706/25 |
| 2016/0070247 A1* | 3/2016 | Ohishi | G05B 19/04 700/275 |

FOREIGN PATENT DOCUMENTS

| JP | 4-264664 A | 9/1992 |
| JP | 10-247087 A | 9/1998 |
| JP | 2000-270595 A | 9/2000 |
| JP | 2004-312894 A | 11/2004 |
| JP | 2005-313701 A | 11/2005 |
| JP | 2006-141092 A | 6/2006 |
| JP | 2006-172141 A | 6/2006 |
| JP | 2007-233634 A | 9/2007 |

(Continued)

*Primary Examiner* — Eduardo Colon Santana
*Assistant Examiner* — Gabriel Agared
(74) *Attorney, Agent, or Firm* — Hauptman Ham, LLP (57) ABSTRACT

A machine learning system according to an embodiment of the present invention includes a state observer for observing the rotation number, torque, current, and voltage values of a motor detected by a motor controller for driving the motor; a motor output calculator for calculating a motor output from the rotation number, torque, current, and voltage values of the motor observed by the state observer; a reward calculator for calculating a reward based on the motor output; and a learning unit for updating an action value table based on the rotation number, torque, current, and voltage values of the motor.

7 Claims, 5 Drawing Sheets

(56) References Cited

FOREIGN PATENT DOCUMENTS

| | | |
|---|---|---|
| JP | 2009-149425 A | 7/2009 |
| JP | 2010-86405 A | 4/2010 |
| JP | 2013-106202 A | 5/2013 |
| JP | 2015-167041 A | 9/2015 |
| WO | 2011/040591 A1 | 4/2011 |
| WO | 2014/024360 A1 | 2/2014 |
| WO | 2015/029158 A1 | 3/2015 |

* cited by examiner

EXAMPLE OF ADJUSTMENT (MEASUREMENT VALUES)
WHEN SPECIFIC PARAMETER IS SET AT 100 (DEFAULT SETTING)

| ROTATION NUMBER [min⁻¹] | TORQUE [Nm] | VOLTAGE [V] | CURRENT [A] | SLIP [min⁻¹] | SLIP [%] | INPUT [kW] | OUTPUT [kW] | LOSS [kW] | LM [V] | EFFICIENCY [%] | POWER FACTOR [%] | POWER SUPPLY VOLTAGE [V] | TEMPERATURE [°C] |
|---|---|---|---|---|---|---|---|---|---|---|---|---|---|
| 9000 | 47.1 | 184.0 | 182.6 | 262 | 2.8% | 49.7 | 44.39 | 5.35 | 9.8 | 89.3% | 85.4% | 199.9 | 38 |

↓ CHANGE IN OUTPUT

FIG. 6B

WHEN SPECIFIC PARAMETER IS SET AT 105

| ROTATION NUMBER [min⁻¹] | TORQUE [Nm] | VOLTAGE [V] | CURRENT [A] | SLIP [min⁻¹] | SLIP [%] | INPUT [kW] | OUTPUT [kW] | LOSS [kW] | LM [V] | EFFICIENCY [%] | POWER FACTOR [%] | POWER SUPPLY VOLTAGE [V] | TEMPERATURE [°C] |
|---|---|---|---|---|---|---|---|---|---|---|---|---|---|
| 9000 | 43.8 | 183.2 | 171.9 | 233 | 2.5% | 46.6 | 41.28 | 5.32 | 9.8 | 88.6% | 85.5% | 200.7 | 38 |

MACHINE LEARNING SYSTEM AND MOTOR CONTROL SYSTEM HAVING FUNCTION OF AUTOMATICALLY ADJUSTING PARAMETER

This application is a new U.S. patent application that claims benefit of JP 2015-193828 filed on Sep. 30, 2015, the content of 2015-193828 is incorporated herein by reference.

BACKGROUND OF THE INVENTION

1. Field of the Invention

The present invention relates to a machine learning system and a motor control system, and in particular relates to a machine learning system and a motor control system having the function of automatically adjusting a parameter.

2. Description of Related Art

Motors are controlled by motor control systems using various operation parameters to obtain desired output characteristics. In the conventional motor control system, the operation parameters of the motor are manually adjusted to obtain the desired output characteristics (for example, Japanese Unexamined Patent Publication (Kokai) No. 2000-270595).

However, manual adjustment of the operation parameters requires many man-hours.

SUMMARY OF THE INVENTION

The present invention aims at providing a machine learning system and a motor control system that can automatically adjust the operation parameters of a motor by machine learning to obtain desired output characteristics.

A machine learning system according to an embodiment of the present invention includes a state observer for observing the rotation number, torque, current, and voltage values of a motor detected by a motor controller for driving the motor; a motor output calculator for calculating a motor output from the rotation number, torque, current, and voltage values of the motor observed by the state observer; a reward calculator for calculating a reward based on the motor output; and a learning unit for updating an action value table based on the rotation number, torque, current, and voltage values of the motor.

A motor control system according to an embodiment of the present invention includes the machine learning system and the motor controller.

BRIEF DESCRIPTION OF THE DRAWINGS

The objects, features, and advantages of the present invention will become more apparent from the following description of an embodiment in conjunction with the attached drawings, wherein.

DETAILED DESCRIPTION OF THE INVENTION

A machine learning system and a motor control system according to the present invention will be described below with reference to the drawings.

Figure 1:
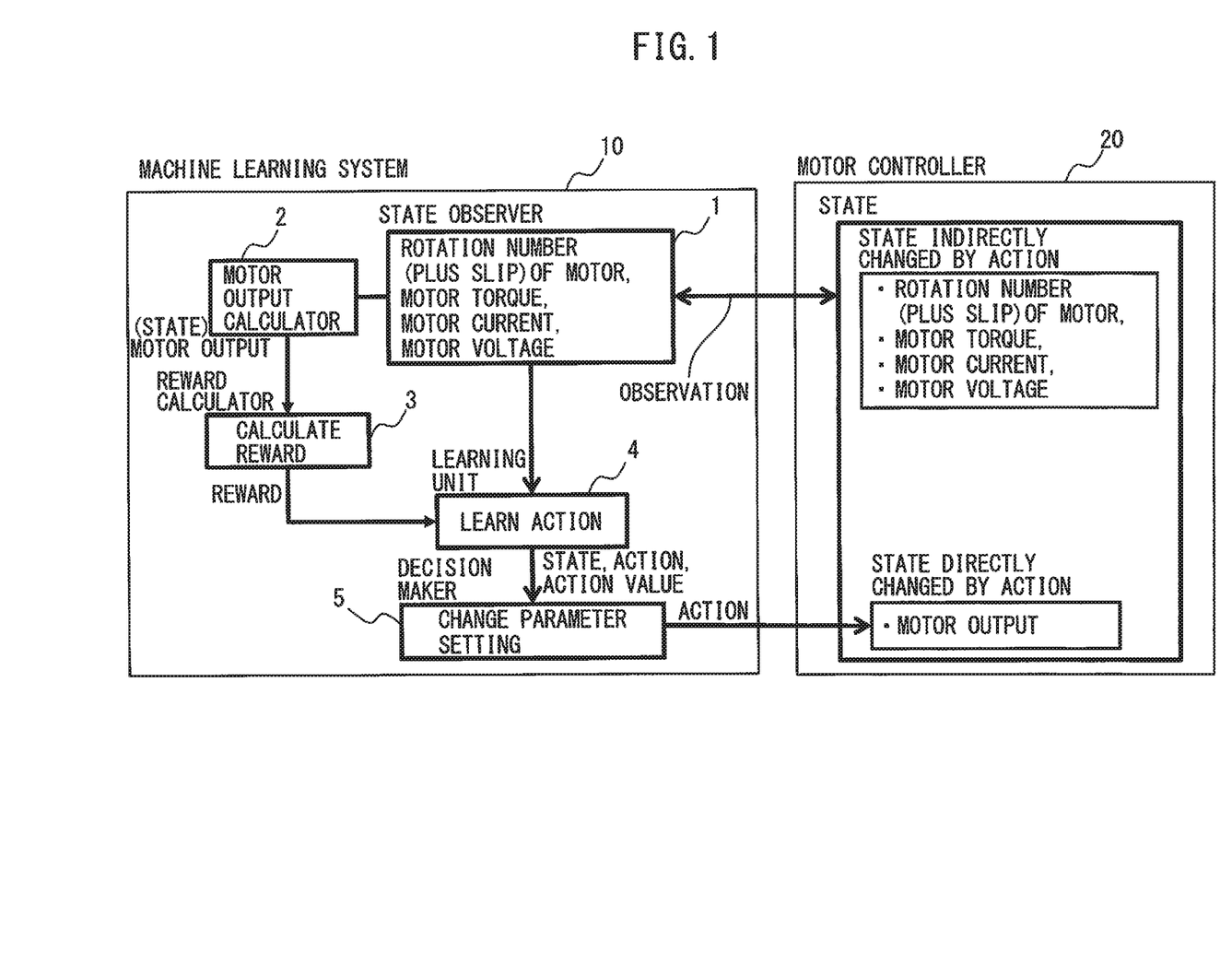
FIG. 1 is a block diagram of a machine learning system according to an embodiment of the present invention.

FIG. 1 is a block diagram of a machine learning system according to an embodiment of the present invention. A machine learning system 10 according to the embodiment of the present invention includes a state observer 1, a motor output calculator 2, a reward calculator 3, and a learning unit 4.

The state observer 1 observes the rotation number, torque, current, and voltage values of a motor (not shown) detected by a motor controller 20 for driving the motor. However, these parameters are just an example, and another parameter may be observed instead.

The motor output calculator 2 calculates a motor output based on the rotation number, torque, current, and voltage values of the motor observed by the state observer 1. The motor output W [W] is calculated from the following equation using a torque T [N·m] and a rotation speed N [min$^{-1}$].

$$W = (2 \times \pi \times T \times N)/60$$

The reward calculator 3 calculates a reward based on the motor output. A method for calculating the reward will be described later on.

The learning unit 4 updates an action value table based on the rotation number, torque, current, and voltage values of the motor. A method for updating the action value table will be described later on.

The machine learning system 10 preferably further includes a decision maker 5 for determining an optimal parameter based on the action value table.

The method for calculating the reward will be described. By way of example, the reward calculator 3 may provide a negative reward when the motor output is higher or lower than the specified range of a target motor output, while the reward calculator 3 may provide a positive reward when the motor output is within the specified range of the target motor output.

Figure 2:
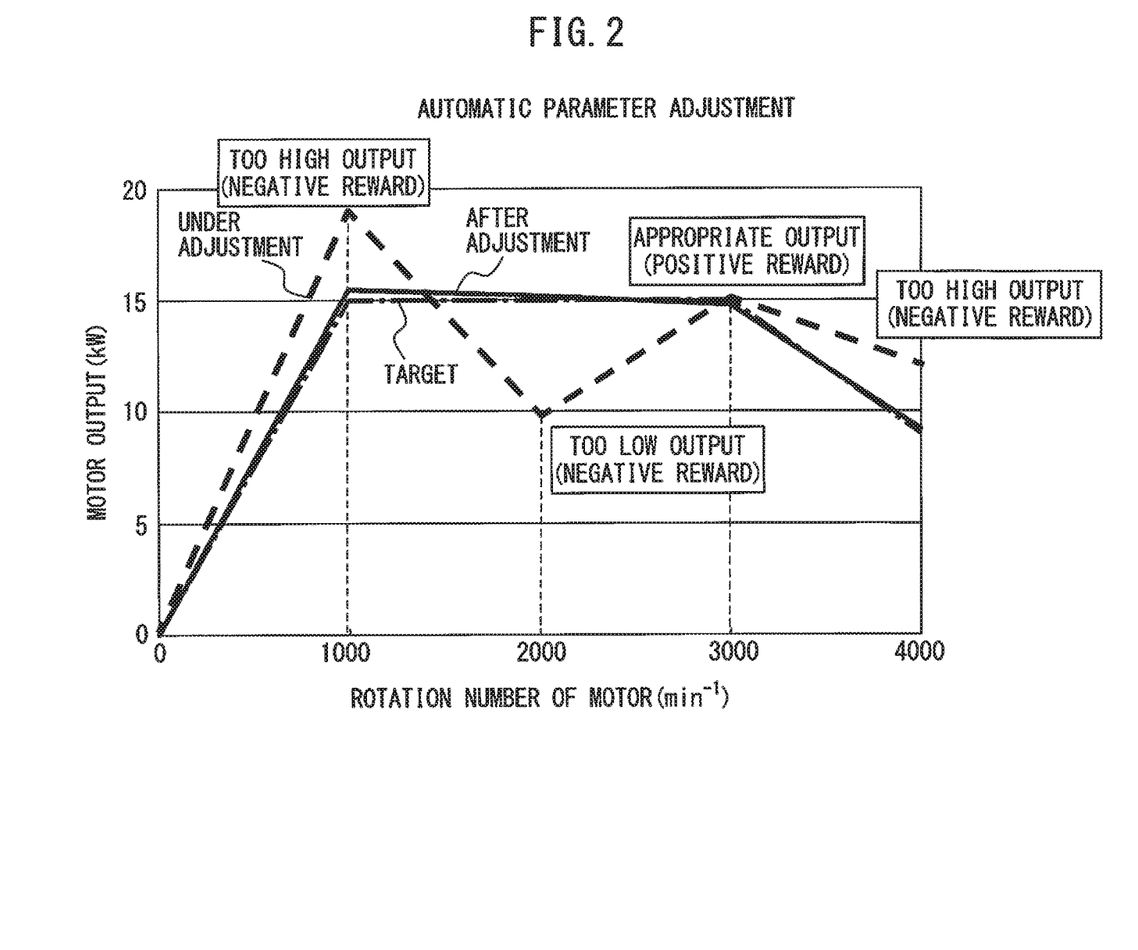
FIG. 2 is a graph showing motor output characteristics before and after an adjustment of a parameter by the machine learning system according to the embodiment of the present invention.

For example, as shown in FIG. 2, it is assumed that when the rotation number of the motor is 1000 [min$^{-1}$], the motor output [kW] is much higher than the specified range of the target output. In this instance, the reward calculator 3 provides a negative reward. Also, it is assumed that when the rotation number of the motor is 2000 [min$^{-1}$], the motor output [kW] is much lower than the specified range of the target output. In this instance, the reward calculator 3 provides a negative reward. On the other hand, it is assumed that when the rotation number of the motor is 3000 [min$^{-1}$], the motor output [kW] is appropriate. In this instance, since the motor output is within the specified range of the target output, the reward calculator 3 provides a positive reward.

Figure 4:
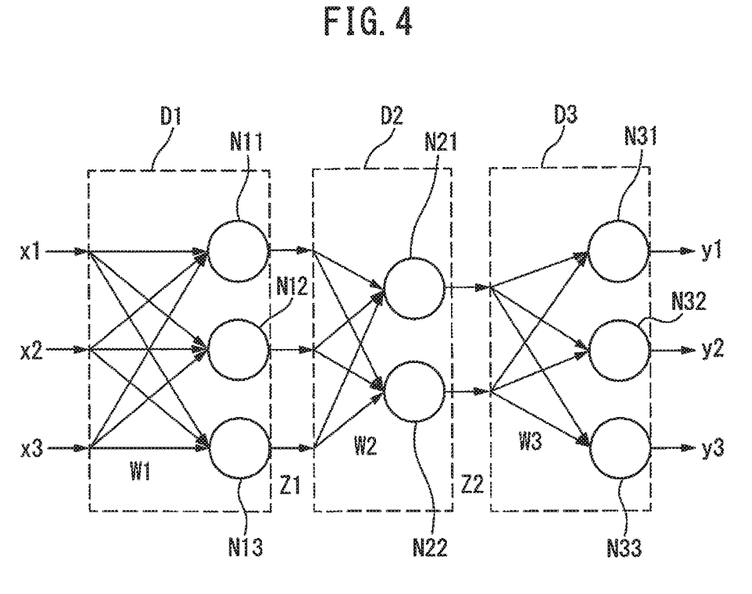
FIG. 4 is a schematic view of a model for a three-layer neural network used in the machine learning system according to the embodiment of the present invention.

The learning unit 4 preferably performs a computation of state variables observed by the state observer 1 in a multilayer structure, and updates the action value table in real time. As a method for performing the computation of the state variables in the multilayer structure, for example, a multilayer neural network, as shown in FIG. 4, could be used.

The machine learning system 10 shown in FIG. 1 will be hereinafter described in detail. The machine learning system 10 has the function of learning knowledge, as well as the functions of extracting useful rules, knowledge representations, criteria, and the like from a data group inputted to the system by analysis and outputting determination results. There are various methods therefor, which are broadly divided into "supervised learning", "unsupervised learning", and "reinforcement learning". Moreover, when realizing these methods, a method called "deep learning" is used for learning the extraction of features themselves.

In "supervised learning", a large amount of data pairs of an input and a result (label) are provided to the machine learning system. The machine learning system learns features from the data set, and heuristically obtains a model to predict a result from an input, that is, the relationship therebetween. In this embodiment, the parameter setting can be changed based on the observation results of the rotation number (plus slip), torque, current, and voltage values of the motor by the state observer 1 and the rewards calculated in the reward calculator 3. The above-described learning can be realized using an algorithm such as the neural network, which is described later on.

In "unsupervised learning", only a large amount of input data is provided to the machine learning system. The machine learning system learns the distribution of the input data and applies compression, classification, alignment, or the like to the input data, without being applied with corresponding output data as supervisors. The features of the data set can be subjected to clustering by analogy. With the use of this result, while providing a certain criterion, an output is assigned so as to optimize the criterion, and this allows a prediction of the output. There is also a method called "semi-supervised learning" as an intermediate problem setting between the "supervised learning" and the "unsupervised learning", in which part of data includes pairs of an input and an output while the other includes only inputs. In this embodiment, the unsupervised learning uses data that can be obtained without actually operating a fan motor, in order to improve learning efficiency.

Problems in the reinforcement learning are determined as follows.
 The motor controller observes an environment state and determines an action.
 An environment varies in accordance with some rule, and in addition, an action itself sometimes varies the environment.
 A reward signal returns whenever an action is performed.
 The aim is to maximize a total (discounted) reward in the future.
 The learning is started from a state in which a result brought about by an action is never or insufficiently known. The motor controller obtains the result as data, only after the motor is actually operated. That is to say, it is required to search for an optimal action through trial and error.
 The learning may be started from a good start point by performing prior learning (using a method of the above-described supervised learning or inverse reinforcement learning) so as to mimic the action of a human in an initial state.

The "reinforcement learning" is a method for learning a sequence of optimal actions by learning, as well as determining and classifying, actions based on the interactions between the action and an environment, in other words, a learning method to maximize a total reward obtained in the future. In this embodiment, this indicates that a sequence of actions having an effect on the future can be obtained. The following description takes Q learning as an example, but is not limited thereto.

The Q learning is a method for learning a Q(s, a) value for selecting an action "a" in a certain environment state "s". That is to say, in a certain state "s", an action "a" having the highest Q(s, a) value is selected as an optimal action. However, a correct Q(s, a) value as to a combination of a state "s" and an action "a" is not initially known. Thus, an agent chooses various actions "a" in a certain state "s", and executing each action "a" in the state "s" provides the agent with a reward. Therefore, the agent learns to choose a better action, that is, a correct Q(s, a) value.

The aim is to maximize a total reward to be obtained in the future, as a result of choosing a sequence of actions. Thus, the agent eventually aims at Q(s, a)=E [Σγ$^t$r$_t$] (an expected value of a total discounted reward: γ is a discount factor) (the expected value is taken when the agent moves from state to state by performing a sequence of optimal actions. The sequence of optimal actions has not been known as a matter of course, and hence has to be found while learning.). For example, an update equation for a Q(s, a) value is represented as follows:

$$Q(s_t, a_t) \leftarrow Q(s_t, a_t) + \alpha\left(r_{t+1} + \gamma \max_a Q(s_{t+1}, a) - Q(s_t, a_t)\right)$$

where $s_t$ represents an environment state at a time t, and $a_t$ represents an action at the time t. By executing the action $a_t$, the agent moves to a state $s_{t+1}$. The state change provides the agent with a reward $r_{t+1}$. A term with "max" represents the product of a Q value, when an action "a" having the highest Q value that has been known at that time is chosen in the state $s_{t+1}$, and γ. "γ" is a parameter of 0<γ≤1 called discount factor. "α" is a learning rate in the range of 0<α≤1.

This equation indicates a method for updating a Q ($s_t$, $a_t$) value of an action $a_t$ in a state $s_t$ based on a reward $r_{t+1}$ that has returned as a result of the action $a_t$. This update equation indicates that, as compared with a Q($s_t$, $a_t$) value of an action "a" in a state "s", if a Q($s_{t+1}$, max $a_{t+1}$) value of an optimal action "max a" in the next state derived from a reward $r_{t+1}$ plus the action "a" is higher, Q($s_t$, $a_t$) is increased. If not, Q($s_t$, $a_t$) is decreased. That is to say, the value of an action in a certain state is approximated to an optimal action value in the next state that is derived from a reward returning as a result of the action and the action itself.

There are two methods for representing Q(s, a) values in a computer, that is, a method in which Q values of all state-action pairs (s, a) are retained in a table (action value table) and a method in which a function for approximating Q(s, a) values is prepared. In a latter method, the above-described update equation can be realized by adjusting a parameter for an approximation function using a stochastic gradient descent method or the like. As the approximation function, a neural network can be used as described later on.

As an approximation algorithm for a value function in the supervised learning, the unsupervised learning, and the reinforcement learning, a neural network can be used. The neural network is composed of, for example, an arithmetic unit, memory, and the like that imitate a model of a neuron as shown in FIG. 3.

Figure 3:
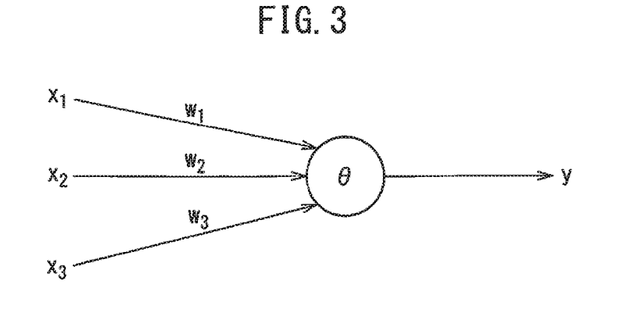
FIG. 3 is a schematic view of a model for a neuron used in the machine learning system according to the embodiment of the present invention.

As shown in FIG. 3, a neuron produces an output y in response to a plurality of inputs x (for example, inputs $x_1$ to $x_3$). Each of the inputs $x_1$ to $x_3$ is applied with a weight w ($w_1$ to $w_3$) corresponding to the input x. Thus, the neuron produces the output y represented by the following equation. Note that, the input x, the output y, and the weight w are all in the form of a vector.

$$y = f_k(\Sigma_{i=1}^n x_i w_i - \theta)$$

Where $\theta$ is a bias, and $f_k$ is an activation function.

Next, a three-layer neural network into which the above-described neurons are combined will be described with reference to FIG. 4. FIG. 4 is a schematic view of the neural network having weights of three layers D1 to D3.

As shown in FIG. 4, a plurality of inputs x (for example, inputs x1 to x3) are inputted from the left of the neural network, and a result y (for example, results y1 to y3) is outputted from the right thereof.

To be more specific, the inputs x1 to x3 are inputted to each of the three neurons N11 to N13 while being weighted correspondingly. The weights applied to the inputs are collectively indicated by W1.

The neurons N11 to N13 output vectors Z11 to Z13, respectively. The vectors 211 to Z13 are collectively indicated by a feature vector Z1, which is regarded as a vector that extracts a feature amount from the input vector. The feature vector Z1 is a feature vector between the weight W1 and a weight W2.

The vectors Z11 to Z13 are inputted to each of two neurons N21 and N22 while being weighted correspondingly. The weights applied to the feature vectors are collectively indicated by W2.

The neurons N21 and N22 output vectors Z21 and Z22, respectively. The vectors Z21 and Z22 are collectively indicated by a feature vector Z2. The feature vector Z2 is a feature vector between the the weight W2 and a weight W3.

The feature vectors Z21 and Z22 are inputted to each of three neurons N31 to N33 while being weighted correspondingly. The weights applied to the feature vectors are collectively indicated by W3.

Finally, the neurons N31 to N33 output results y1 to y3, respectively.

The neural network has a learning mode and a value prediction mode. In the learning mode, the weight W is learned using a learning data set. In the value prediction mode, the action of the fan motor is determined through the use of the parameter (the word "prediction" is used for the sake of convenience, but various tasks including detection, classification, inference, and the like can be executed).

The agent may immediately learn data that is obtained by actually operating the motor in the value prediction mode, and reflect the learning result in the next action (on-line learning). Also, the agent may collectively learn a data group collected in advance, and perform a detection mode thereafter using the parameter (batch learning). The agent may perform the learning mode whenever a certain amount of data is accumulated.

The weights W1 to W3 can be learned using an error back propagation algorithm (backpropagation algorithm). Information about an error enters from the right and propagates to the left. The error back propagation algorithm is a method in which the weights are adjusted (learned) with respect to each neuron so as to minimize the difference between an output y and an actual output y (supervisor) in response to an input x.

Such a neural network may have more than three layers (called deep learning). An arithmetic unit that performs feature extraction from inputs in stages and regression of results can be automatically acquired from only supervisor data.

Accordingly, in order to perform the Q learning described above, as shown in FIG. 1, the machine learning system 10 according to this embodiment includes the state observer 1, the learning unit 4, and the decision maker 5. However, a machine learning method applied to the present invention is not limited to the Q learning. For example, in the instance of applying the supervised learning, a value function corresponds to a learning model, and a reward corresponds to an error.

As shown in FIG. 1, the state of the motor controller 20 includes a state indirectly changed by an action and a state directly changed by an action. The state indirectly changed by an action includes the rotation number (plus slip), torque, current, and voltage values of the motor. The state directly changed by an action includes the motor output.

The learning unit 4 updates the action values corresponding to the current state variable and actions to be taken in the action value table, based on the update equation and the reward.

The machine learning system 10 may be connected to the motor controller 20 through a network, and the state observer 1 may acquire the current state variable through the network. The machine learning system 10 is preferably present in a cloud server.

The machine learning system 10 may be contained in a motor control system for controlling the motor. That is to say, the motor control system may include the machine learning system 10 and the motor controller 20.

In the example of FIG. 1, the own action value table is updated using the action value table updated by the learning unit of the machine learning system by itself, but is not limited thereto. That is to say, the own action value table may be updated using an action value table updated by a learning unit of another machine learning system different from the own machine learning system.

Figure 5:
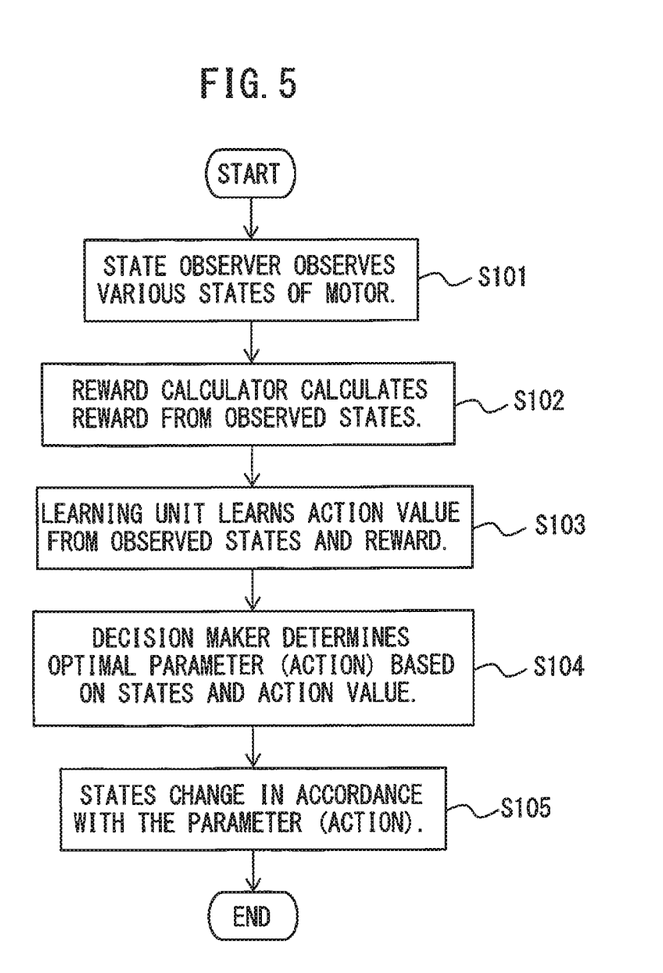
FIG. 5 is a flowchart of the operation process of the machine learning system according to the embodiment of the present invention.

The operation of the machine learning system according to the embodiment of the present invention will be described. FIG. 5 is a flowchart of the operation process of the machine learning system according to the embodiment of the present invention.

First, in step S101, the state observer 1 observes the various states of the motor. In other words, the state observer 1 observes the rotation number, torque, current, and voltage values of the motor detected by the motor controller 20 for driving the motor.

Next, in step S102, the reward calculator 3 calculates a reward from the observed states. For example, the reward calculator 3 provides a negative reward when the motor output is higher or lower than the specified range of the target motor output, while the reward calculator 3 provides a positive reward when the motor output is within the specified range of the target motor output.

Next, in step S103, the learning unit 4 learns an action value from the observed states and the reward.

Next, in step S104, the decision maker 5 determines an optimal parameter (action) based on the states and the action value. For example, the decision maker 5 determines operation parameters (the rotation number, torque, current, and voltage values of the motor) to obtain desired motor output characteristics.

Next, in step S105, the states change in accordance with the parameter (action). That is to say, the motor controller 20 provides a desired motor output.

Figure 6A:
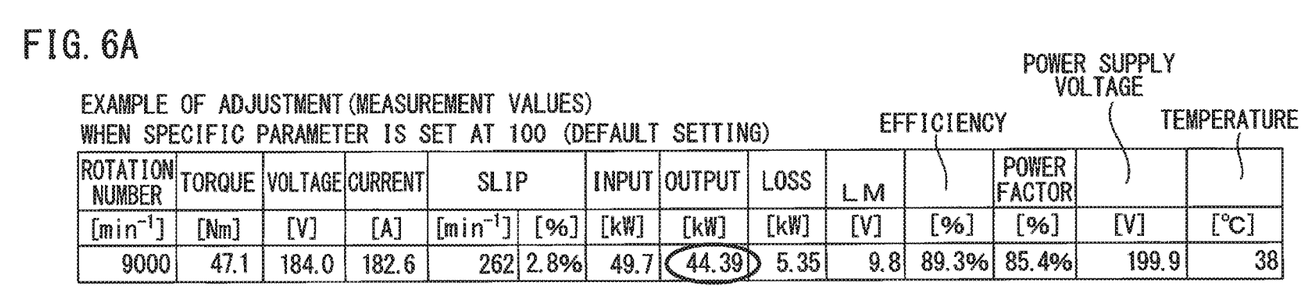
FIG. 6A is a table showing motor output characteristics before the adjustment of the parameter by the machine learning system according to the embodiment of the present invention.
Figure 6B:
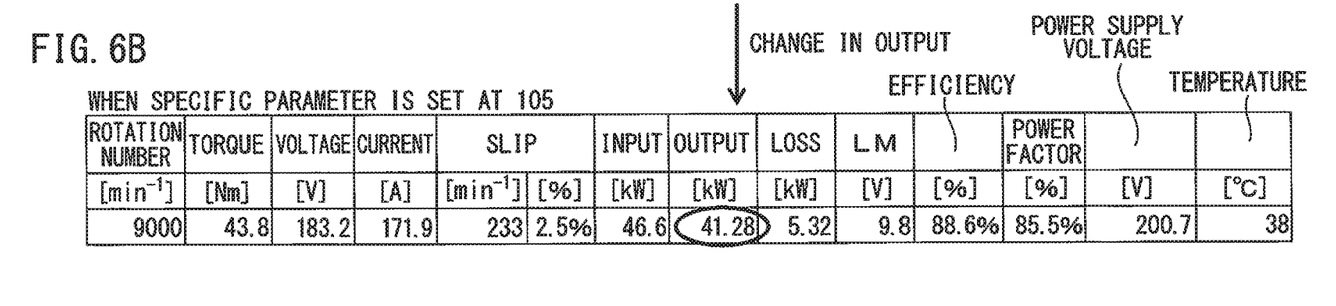
FIG. 6B is a table showing the motor output characteristics after the adjustment of the parameter by the machine learning system according to the embodiment of the present invention.

The motor output, which is the state that an action changes directly, reaches its target value in this manner. FIGS. 6A and 6B show an example of adjustment of the operation parameters according to the present invention. FIGS. 6A and 6B are tables showing motor output characteristics before and after the adjustment of the parameter, respectively, by the machine learning system according to the embodiment of the present invention. FIG. 6A shows the rotation number, torque, voltage, current, slip, input, output, loss, LM, efficiency, power factor, power supply voltage, and temperature values of the motor, when a specific parameter is set at 100 (default setting), which is a value before the adjustment. FIG. 6B shows the values of the above items, when the specific parameter is set at 105.

As is apparent from FIGS. 6A and 6B, changing the specific parameter from 100 to 105, the motor output is adjusted from 44.39 [kW] to 41.28 [kW]. According to the present invention, such an adjustment can be automatically performed by machine learning.

As described above, according to the machine learning system and the motor control system of the embodiment of the present invention, the operation parameters of the motor can be automatically adjusted by machine learning to the desired output characteristics, thus allowing a reduction in man-hours for the adjustment of the parameter.

What is claimed is:

1. A machine learning system comprising:
   a state observer for observing the rotation number, torque, current, and voltage values of a motor detected by a motor controller for driving the motor;
   a motor output calculator for calculating a motor output from the rotation number, torque, current, and voltage values of the motor observed by the state observer;
   a reward calculator for calculating a reward based on the motor output; and
   a learning unit for updating an action value table based on the rotation number, torque, current, and voltage values of the motor;
   wherein the learning unit is configured to update the action value table to maximize a total reward to be obtained in the future.

2. The machine learning system according to claim 1, further comprising
   a decision maker for determining an optimal parameter based on the action value table.

3. The machine learning system according to claim 1, wherein the reward calculator provides a negative reward when the motor output is higher or lower than the specified range of a target motor output,
   while the reward calculator provides a positive reward when the motor output is within the specified range of the target motor output.

4. The machine learning system according to claim 1, wherein the learning unit performs an arithmetic operation of a state variable observed by the state observer in a multilayer structure, and updates the action value table in real time.

5. The machine learning system according to claim 1, wherein the action value table is updated using another action value table updated by another learning unit in another machine learning system.

6. A motor control system comprising:
   the machine learning system according to claim 1; and
   the motor controller.

7. The machine learning system according to claim 1, wherein the learning unit is configured to update the action value table based on the rotation number, torque, current, voltage values of the motor and the calculated reward.

* * * * *